3,590,031
3,4-BISNOR-5-AZA-A-ANDROSTANES
Seymour D. Levine, North Brunswick, N.J., assignor to
E. R. Squibb & Sons, Inc., New York, N.Y.
No Drawing. Filed Nov. 20, 1967, Ser. No. 684,521
Int. Cl. C07d *39/00*
U.S. Cl. 260—239          7 Claims

ABSTRACT OF THE DISCLOSURE

This invention relates to the preparation of novel steroidal β-lactams having the formula:

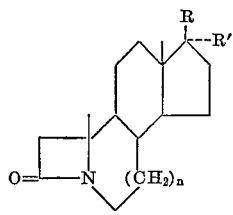

wherein R is selected from the group consisting of hydroxy and acyloxy, R' is selected from the group consisting of hydrogen, ethyl, vinyl and ethynyl, R and R' taken together represent oxo, and $n$ represents 1 or 2. The β-lactams of this invention are physiologically active materials possessing anti-androgenic activity.

---

This invention relates to and has as its objective the provision of novel physiologically active steroids and new intermediates useful in the preparation thereof.

The final products of this invention can be represented by the general formula:

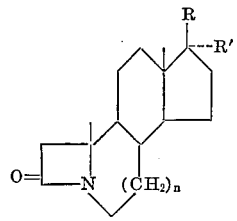

wherein R is selected from the group consisting of hydroxy and acyloxy, R' is selected from the group consisting of hydrogen, ethyl, vinyl and ethynyl, R and R' taken together represent oxo, and $n$ represents 1 or 2. The β-lactams of this invention are physiologically active materials possessing anti-androgenic activity.

The final products of this invention are physiologically active substances useful in both human and veterinary medicine. They are highly useful agents in inhibiting or counteracting the effects of androgens (being therefore called anti-androgens) such as testosterone. For example, abatement of skin eruptions in cases of hyperandrogenic acne (the acne condition resulting from the overabundance of an androgen such as testosterone) may be achieved by the peroral administration of the antiandrogens of this invention in dosages of from about 10 to 200 mg./kg. of body weight daily. They may also be administered systemically (e.g., subcutaneously) in a dosage of from about 2 to 60 mg./kg. of body weight daily. Further topical application may be employed in the treatment of this condition, utilizing, for instance a cream or lotion containing from about 1 to 25% of the final product of this invention.

As anti-androgens, the final products of this invention have been found to be useful in veterinary medicine. Male swine, the meat of which is usually rendered unpalatable by a characteristic odor developed by the mature animal which permeates the meat, may be treated with the final products of this invention in order to suppress the formation of the odor and hence render the meat more palatable. Likewise the caponizing of male chickens may be achieved without resort to castration by means of administration of the final products of this invention. For these purposes they may be administered orally at a dosage of about 10 to 200 mg./kg. of body weight daily, or parenterally at a dosage of about 2 to 60 mg./kg. of body weight daily.

Perorally acceptable formulations can be prepared in the usual manner to provide an aqueous suspension, an elixir or a solid dosage unit form (e.g., tablet, powder or capsule), for example, two-piece hard gelatin capsules may be filled with a mixture of the active ingredient and excipients (e.g., starch, talc, stearic acid, and/or magnesium stearate). Also one-piece gelatin capsules containing the same amount of medicament may be prepared using sufficient corn oil or other suitable vegetable oil, to render the compound capsulatable. Tablets may be prepared by using starch, lactose of other conventional excipients, and may be scored to enable the administration of fractional dosages, if desired. Any of the tableting material used in pharmaceutical practice may be employed. Liquid preparations may be in the form of suspensions, emulsions, syrups or elixirs of the active substance in water or other liquid medium commonly used for making orally acceptable pharmaceutical formulations, such as liquid paraffin, or a syrup elixir base.

The final products of this invention may be formulated into a preparation suitable for topical administration in conventional manner with the aid of one or more carriers or excipients. Examples of types of topical formulation include ointments, creams, sprays, aerosols, and the like. Ointments and creams may, for example, be formulated with an aqueous or oily base with the addition of suitable thickening and/or gelling agents. Such bases may, for example, include water and/or an oil such as liquid paraffin or a vegetable oil such as caster oil, arachis oil or the like. Various thickening agents may be employed in accordance with the nature of the base, for example, soft paraffin, aluminum stearate, cetostearyl alcohols, polyethylene glycols, woolfat, hydrogenated lanolin, and the like. Lotions may likewise be formulated with an aqueous or oily base and will in general also include various emulsifying agents, dispersing agents, suspending agents, thickening agents, coloring agents, perfumes, and the like.

In addition, the compounds of this invention (both intermediate and final products) are surface active agents which may therefor be employed in a variety of applications requiring such an agent. For example, the compounds of this invention may be employed as emulsifying agents in the preparation of lubricants, adhesives, polishes, wax compositions, and the like. For these purposes the compounds of this invention may be employed in concentrations of about 0.5 to about 20.0 weight percent based upon the total composition.

They may also be employed as antioxidants and corrosion inhibitors for various hydrocarbons and mixtures thereof. As examples of materials to which the compounds of this invention may be added for this purpose may be mentioned gasoline, hydrocarbon lubricating oils and greases, hydrocarbon solvents( e.g., toluene, kerosene), rubber, polyolefin plastics (e.g., polyethylene, polypropylene) and the like. For this purpose they may be employed in concentrations ranging from about 0.01 to about 1.0 weight percent based upon the total composition.

The final products of this invention may be prepared beginning with either A-nortestosterone or A-nor-B-nortestisterone in accordance with the following reaction schema, wherein Ac represents an acyl radical, and $n$ represents 1 or 2:
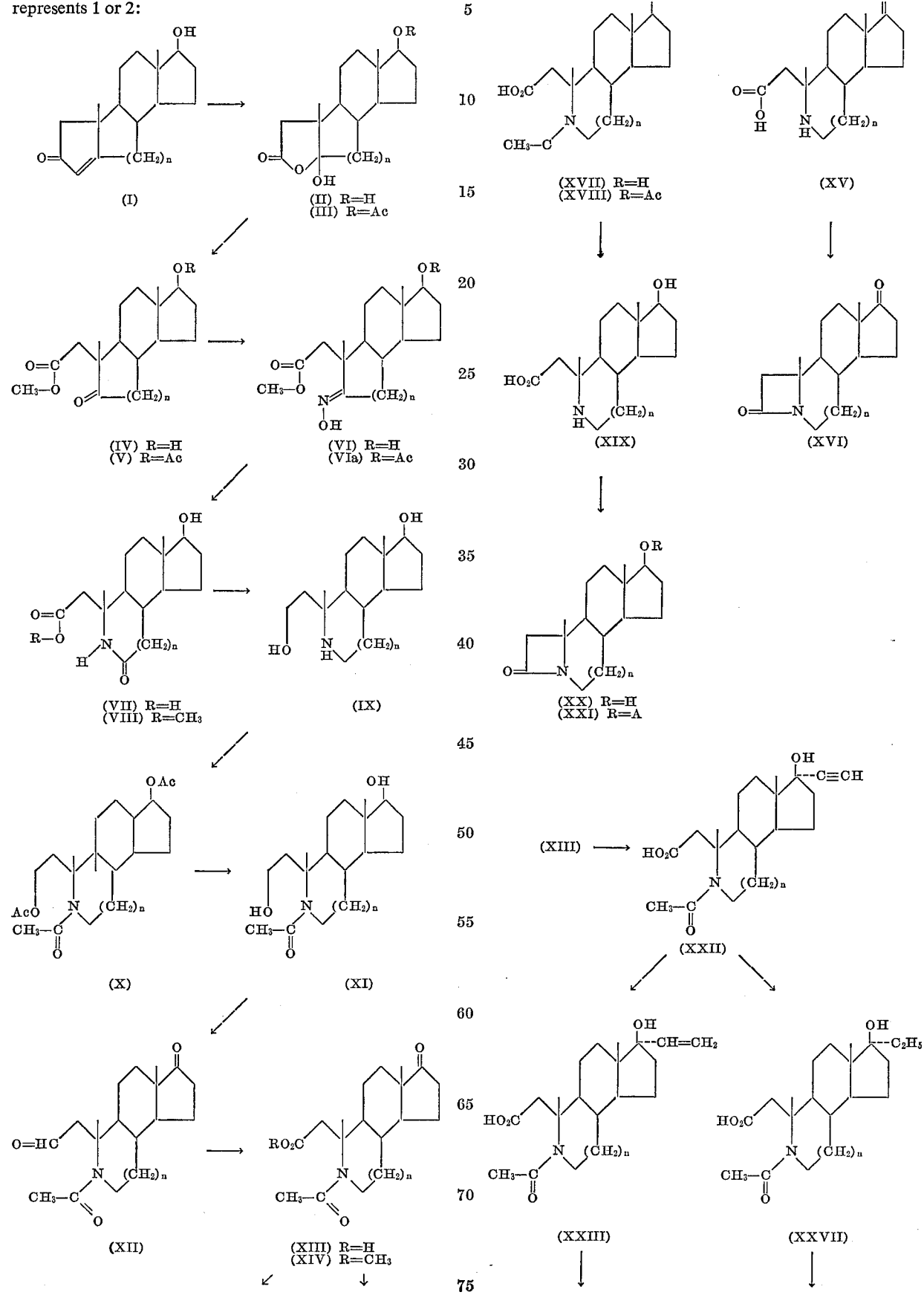

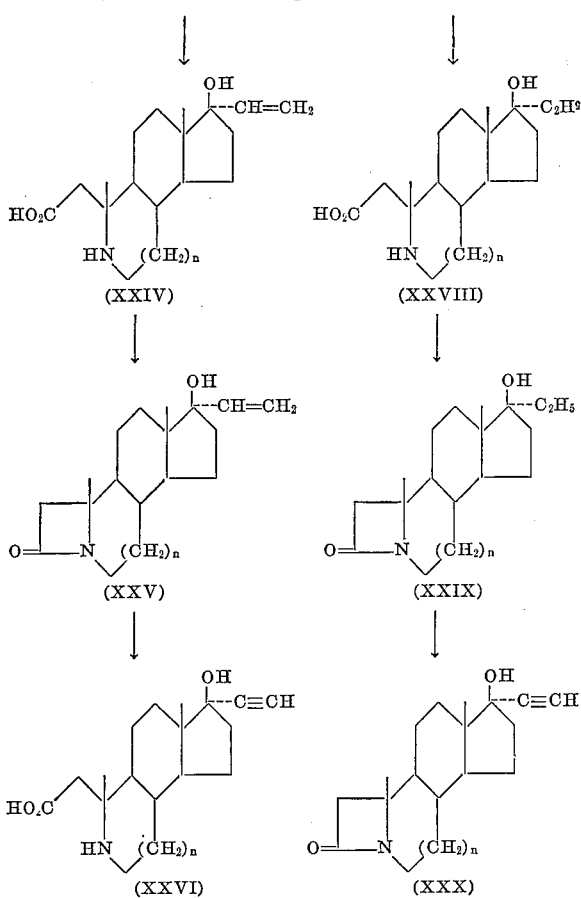

In the following description the preparation of the final products of this invention will be described employing A-nortestosterone as a starting material. The use of A-nortestosterone results in a final product possessing a seven-membered B-ring. It will be understood, however, that the preparation of compounds of this invention possessing a six-membered B-ring is achieved by the substitution of A-nor-B-nortestosterone as the starting material, all described reactions being carried out in the same manner as set forth below. A-nortestosterone is of course well known. A-nor-B-nortestosterone has been disclosed in U.S. Pat. No. 3,331,868, issued to Holden et al. on July 18, 1967.

In the first step of the process of this invention, A-nortestosterone is reacted in accordance with the procedure set forth by Weisenborn et al., JACS, 76, 555, 1964, to produce 3-oxa-A-norandrostane - 5β,17β - diol-2-one (Compound II). Alternatively, Compound II may be prepared by hydroxylation of A-nortestosterone (I) with osmium tetroxide followed by oxidation with periodic acid. The lactonol (II) thus prepared is then esterified with acetic anhydride in pyridine at room temperature to give Compound III.

Compounds II or III may be esterified with diazomethane to give the methyl esters, IV or V, respectively.

Either ester may then be treated with hydroxylamine hydrochloride in pyridine at room temperature to afford the oximes (VI or VIa, respectively).

Beckmann rearrangement of the oxime (with thionyl chloride in dioxane) followed by hydrolysis with 25% aqueous potassium hydroxide solution gives the lactam acid (VII) which is then esterified with diazomethane to produce the methyl ester (VIII).

Reduction of Compound VIII with lithium aluminum hydride in tetrahydrofuran gives the dihydroxy amine (IX).

Compound IX is then acetylated with acetic anhydride in pyridine to obtain the N-acetyl diacetate (X) which is selectively hydrolyzed with potassium carbonate in methanol to the N-acetyl diol (XI).

Oxidation of Compound XI with Jones reagent (CrO₃—H₂SO₄)

at ice bath temperature gives the N-acetyl aldehyde (XII) which is then treated with silver oxide at room temperature to produce the N-acetyl amino acid (XIII). If desired, Compound XIII may then be esterified with diazomethane to produce Compound XIV.

Compound XIV, aside from being an intermediate in the preparation of the novel steroidal β-lactams of this invention, is also a final product which possesses anti-androgenic activity.

Compounds XIII or XIV may be refluxed in dioxane containing concentrated hydrochloric acid to remove the N-acetyl group, thus forming the amino acid (XV).

The amino acid is then cyclized by treatment at room temperature with dicyclohexylcarbodiimide in nitromethane to produce the steroidal β-lactam (XVI), which is a final product of this invention.

Alternatively, Compound XIII may be treated with NaBH₄ to produce the acid (XVII), which in turn may be converted to the acetoxy compound (XVIII) by treatment with acetic anhydride in pyridine at room temperature.

Compounds XVII or XVIII may be refluxed in dioxane containing concentrated hydrochloric acid to remove the N-acetyl group, thus forming the amino acid (XIV).

Amino acid (XIX) is then cyclized in dioxane at room temperature with diisopropylcarbodiimide to produce the steroidal β-lactam (XX), which in turn may be converted to the 17β-acetoxy derivative (XXI) by treatment with acetic anhydride in pyridine. Compounds XX and XXI are each final products of this invention.

Alternatively, Compound XIII may be treated with a complex of lithium acetylide and ethylenediamine in a mixture of tetrahydrofuran and benzene to produce the 17α-ethynyl-17β-hydroxy derivative (XXII).

Compound XXII is then hydrogenated over a five percent palladium on carbon catalyst until one mole equivalent of hydrogen is taken up to produce the 17α-vinyl derivative (XXIII). Compound XXIII is then refluxed in dioxane containing concentrated hydrochloric acid to remove the N-acetyl group and produce the amino acid (XXIV), which is in turn cyclized in accordance with the procedure already described in the preparation of the Compound XX to produce the steroidal β-lactam (XXV), which is a final product of this invention.

As a further alternative, Compound XXII may be hydrogenated over a palladium on carbon catalyst until two mole equivalents are taken up to produce the 17α-ethyl derivative (XXVII).

By following the procedure set forth for the preparation of Compounds XXIV and XXV, amino acid (XXVIII) and the β-lactam (XXIX), which is a final product of this invention, may be prepared.

Further, by omitting the hydrogenation step and directly reacting the 17α-ethynyl derivative (XXII) in the manner described above, the 17α-ethynyl amino acid (XXVI) may be formed and converted in the same manner as above to the 17α-ethynyl-β-lactam (XXX) which is a final product of this invention.

The preferred acyl radicals represented by the symbol Ac in the above reaction schema, are those of hydrocarbon carboxylic acids of less than twelve carbon atoms, and may be exemplified by the lower alkanoic acids (e.g., formic, acetic, propionic, butyric, valeric, trimethyl acetic and caproic acids), the lower alkenoic acids (e.g., acrylic, methacrylic, crotonic, 3-butenoic and senecioic acids), the monocyclic aryl-carboxylic acids (e.g., benzoic and toluic acids), the monocyclic aryl-lower alkanoic acids [e.g., phenacetic, β-phenylpropionic, α-phenylbutyric, and 5-(p-methylphenyl) pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cycloalkyl and cycloalkenyl-lower alkanoic acids [e.g., cyclohexaneacetic, α-cyclopentanebutyric, 2-cyclopenteneacetic and 3-(3-cyclohexene) pentenoic acid], and the like.

The invention may be illustrated by the following examples wherein all temperatures are in degrees centigrade:

EXAMPLE 1

3-oxa-17β-acetoxy-A-norandrostane-5β-ol-2-one

A mixture of 100 mg. of 3-oxa-A-norandrostane-5β, 17β-diol-2-one, 1.6 ml. of pyridine and 0.8 ml. of acetic anhydride is left at room temperature for four hours. The reaction mixture is diluted with water and the product collected by filtration and recrystallized from chloroform-isopropyl ether.

EXAMPLE 2

Methyl 17β-acetoxy-2,5-seco-3,4-bisnorandrostane-5-one 2-oic acid

A solution of 1 g. of 3-oxa-17β-acetoxy-A-norandrostane-5β-ol-2-one in 10 ml. of methanol and 25 ml. of ether is treated with an excess of diazomethane in ether. After forty-five minutes at room temperature, acetic acid is added and the solvents evaporated. The residue is dissolved in chloroform and this solution washed with 8% salt solution, dried and evaporated.

EXAMPLE 3

Methyl 17β-hydroxy-2,5-seco-3,4-bisnorandrostane-5-one 2-oic acid

Following the procedure in Example 2, but substituting 3-oxa-17β-hydroxy-A-norandrostane-5β-ol-2-one for 3-oxa-17β-acetoxy-A-norandrostane-5β-ol-2-one, there is obtained the title compound.

EXAMPLE 4

Methyl 5-oximino-17β-acetoxy-2,5-seco-3,4-bisnorandrostane-2-oic acid

A solution of 1 g. of methyl 17β-acetoxy-2,5-seco-3,4-bisnorandrostane-5-one 2-oic acid and 1 g. of hydroxylamine hydrochloride in 20 ml. of pyridine is left at room temperature for three days. The reaction mixture is diluted with ice-water and the product collected by filtration and recrystallized from chloroform-isopropyl ether.

EXAMPLE 5

17β-hydroxy-2,5-seco-3,4-bisnor-5-aza-B-homoandrostane-6-one 2-oic acid

A solution of 365 mg. of methyl 5-oximino-17β-acetoxy-2,5-seco-3,4-bisnorandrostane-2-oic acid in 10 ml. of dioxane is cooled to a solid mass and treated with 0.35 ml. of thionyl chloride. After one hour at room temperature this solution is added to 70 ml. of 25% aqueous potassium hydroxide. This solution is stirred and heated to 90°. The solution is cooled and extracted with ether. The aqueous phase is acidified with hydrochloric acid and extracted with chloroform. The chloroform extracts are washed with 8% salt solution, dried, and evaporated. The residue is crystallized from methanol-isopropyl ether and recrystallized from methanol-isopropyl ether.

EXAMPLE 6

Methyl 17β-hydroxy-2,5-seco-3,4-bisnor-5-aza-B-homoandrostane-6-one 2-oic acid

A solution of 200 mg. of 17β-hydroxy-2,5-seco-3,4-bisnor-5-aza-B-homoandrostane-6-one 2-oic acid in 2 ml. of ether and 0.5 ml. of methanol is treated with an excess of diazomethane in ether. After thirty minutes at room temperature, acetic acid is added and the solvents removed to give the product.

EXAMPLE 7

2,17β-dihydroxy-2,5-seco-3,4-bisnor-5-aza-B-homoandrostane

A solution of 1.29 g. of methyl 17β-hydroxy-2,5-seco-3,4-bisnor-5-aza-B- homoandrostane-6-one 2-oic acid in 150 ml. of tetrahydrofuran is treated with 2.0 g. of lithium aluminum hydride and refluxed for sixty hours. Excess hydride is destroyed with ethyl acetate. The reaction mixture is treated with 25% aqueous sodium hydroxide solution and the layers separated. The aqueous phase is extracted with additional chloroform. The combined organic fractions are washed with 8% salt solution, dried and evaporated. The residue is crystallized from chloroform-isopropyl ether and recrystallized from chloroform-isopropyl ether.

EXAMPLE 8

N-acetyl 2,17β-diacetoxy-2,5-seco-3,4-bisnor-5-aza-B-homoandrostane

A solution of 2.56 g. of 2,17β-dihydroxy-2,5-seco-3,4-bisnor-5-aza-B-homoandrostane in 17 ml. of acetic anhydride and 17 ml. of pyridine is left at room temperature overnight. The reaction mixture is diluted with water and the product collected by filtration and recrystallized from isopropyl ether.

EXAMPLE 9

N-acetyl 2,17β-dihydroxy-2,5-seco-3,4-bisnor-5-aza-B-homoandrostane

A solution of 4.55 g. of N-acetyl 2,17β-diacetoxy-2,5-seco-3,4-bisnor-5-aza-B-homoandrostane in 550 ml. of methanol is treated with 90 ml. of 10% potassium carbonate solution and stirred overnight at room temperature. The solution is concentrated, diluted with water and neutralized with acetic acid. The product is collected by filtration. The aqueous phase is extracted with chloroform and the chloroform extracts washed with 8% salt solution, dried and evaporated. The residue is crystallized from acetone-isopropyl ether to give additional product.

EXAMPLE 10

N-acetyl 2,5-seco-3,4-bisnor-5-aza-B-homoandrostane-2-al-17-one

A solution of 1.00 g. of N-acetyl 2,17β-dihydroxy-2,5-seco-3,4-bisnor-5-aza-B-homoandrostane in 100 ml. of acetone is cooled to 3.5° and treated with an excess of Jones reagent. After two hours at 3.5°, methanol is added to decompose excess oxidant and water is added. The organic solvents are evaporated and the aqueous phase extracted with chloroform. The chloroform extracts are washed with water, 8% salt solution, dried and evaporated. The residue is crystallized from ethyl acetate-isopropyl ether and recrystallized from ethyl acetate-isopropyl ether.

EXAMPLE 11

N-acetyl 2,5-seco-3,4-bisnor-5-aza-B-homoandrostane-17-one-2-oic acid

A solution of 2.6 g. of silver nitrate in 27 ml. of water is added to a solution of 2.48 g. of N-acetyl 2,5-seco-3,4-bisnor-5-aza-B-homoandrostane-2-al-17-one in 55 ml. of 95% ethanol. This solution is treated dropwise with a solution of 2.5 g. sodium hydroxide in 45 ml. of water and the resulting suspension stirred in the dark for four hours. The precipitate is removed by filtration and washed with water and the filtrate is extracted with chloroform. The aqueous phase is acidified and extracted with chloroform. The chloroform extracts are washed with 8% salt solution, dried and evaporated. The residue is crystallized from acetone-isopropyl ether and recrystallized from acetone-isopropyl ether.

EXAMPLE 12

Methyl N-acetyl-2,5-seco-3,4-bisnor-5-aza-B-homoandrostane-17-one 2-oic acid

A solution of 200 mg. of N-acetyl 2,5-seco-3,4-bisnor-5-aza-B-homoandrostane-17-one-2-oic acid in 0.5 ml. of methanol and 2.5 ml. of ether is treated with an excess of diazomethane. After ten minutes at room temperature, acetic acid is added and the mixture concentrated and diluted with water. The aqueous phase is extracted with chloroform and the extracts are washed with 8% salt solution, dried and evaporated. The residue is crystallized from isopropyl ether.

EXAMPLE 13

2-carboxy-2,5-seco-3,4-bisnor-5-aza-B-homoandrostane-17-one

A solution of 200 mg. of N-acetyl-2,5-seco-3,4-bisnor-5-aza-B-homoandrostane-17-one 2-oic acid in 0.3 ml. of water, 5 ml. of concentrated hydrochloric acid, and 15.5 ml. of dioxane is refluxed for seventeen hours, and then evaporated. The residue is taken up in water and the pH of this solution adjusted to pH 5.1 with sodium bicarbonate solution, and 8% salt solution added. This aqueous solution is extracted with chloroform. The aqueous layer is then adjusted to pH 5.5 and evaporated. The residue is treated with several portions of chloroform. The chloroform layers are dried and evaporated to give the product.

EXAMPLE 14

3,4-bisnor-5-aza-B-homoandrostane-2,17-dione

A solution of 452 mg. of 2-carboxy-2,5-seco-3,4-bisnor-5-aza-B-homoandrostane-17-one in 15 ml. of nitromethane is treated with 270 mg. of dicyclohexyl carbodiimide and stirred at room temperature for forty-five hours. The N,N'-dicyclohexylurea is removed by filtration and the filtrate evaporated. The residue is plate chromatographed on neutral alumina using chloroform-hexane (1:1) as the developing solvent. The plate is developed twice and the major band detected with iodine vapor. Elution with ethyl acetate, evaporation and crystallization from ethyl acetate-isopropyl ether give the product.

EXAMPLE 15

N-acetyl-2,5-seco-3,4-bisnor-5-aza-17$\beta$-hydroxy-B-homoandrostane-2-oic acid A solution of 50 mg. of N-acetyl 2-5-seco-3,4-bisnor-5-aza-B-homoandrostane-17-one-2-oic acid in 5 ml. of methanol is treated with 30 mg. of sodium borohydride and stirred at room temperature for one hour. The reaction mixture is concentrated, diluted with water, acidified to pH 2 and extracted with chloroform. The chloroform extracts are washed with 8% salt solution, dried and evaporated. The residue is crystallized from acetone-isopropyl ether.

EXAMPLE 16

N-acetyl-2,5-seco-3,4-bisnor-5-aza-17$\beta$-acetoxy-B-homoandrostante 2-oic acid A solution of 20 mg. of N-acetyl-2,5-seco-3,4-bisnor-5-aza-17$\beta$-hydroxy-B-homoandrostane 2-oic acid in 0.1 ml. of pyridine and 0.1 ml. of acetic anhydride is left at room temperature. The mixture is diluted with water and extracted with chloroform. The chloroform extracts are washed with 8% salt solution, dried and evaporated.

EXAMPLE 17

2-carboxy-2,5-seco-3,4-bisnor-5-aza-17$\beta$-hydroxy-B-homoandrostane

Following the procedure of Example 13, but substituting N-acetyl - 2,5 - seco-3,4-bisnor-5-aza-17$\beta$-hydroxy-B-homoandrostane-2-oic acid or the 17$\beta$-acetoxy compound for N-acetyl-2,5-seco-3,4-bisnor-5-aza-B-homoandrostane-17-one 2-oic acid, there is obtained the title compound.

EXAMPLE 18

3,4-bisnor-5-aza-17$\beta$-hydroxy-B-homoandrostane-2-one

A solution of 143 mg. of 2-carboxy-2,5-seco-3,4-bisnor-5-aza-17$\beta$-hydroxy-B-homoandrostane in 1 ml. of water and 2 ml. of dioxane is treated with a solution of 0.085 ml. of diisopropylcarbodiimide in 1 ml. of dioxane. The mixture is stirred at room temperature over the weekend. The mixture is evaporated and the residue treated with water and extracted with chloroform. The chloroform extracts are washed with 8% salt solution, dried and evaporated. The residue is treated with ethyl acetate, filtered to remove N,N'-diisopropylurea and the filtrate plated on neutral alumina using chloroform as the developing solvent. The major steroid band is detected with iodine vapor, eluted with ethyl acetate, and evaporated to give the product.

EXAMPLE 19

3,4-bisnor-5-aza-17$\beta$-acetoxy-B-homoandrostane-2-one

Following the procedure in Example 1, but substituting 3,4-bisnor - 5 - aza-17$\beta$-hydroxy-B-homoandrostane-2-one for 3-oxa-A-norandrostane-5$\beta$,17$\beta$-diol-2-one, there is obtained the title compound.

EXAMPLE 20

N-acetyl 2,5-seco-3,4-bisnor-5-aza-17$\alpha$-ethynyl-17$\beta$-hydroxy-B-homoandrostane-2-oic acid A solution of 200 mg. N-acetyl 2,5-seco-3,4-bisnor-5-aza-B-homoandrostane-17-one 2-oic acid in 5 ml. of tetrahydrofuran and 4 ml. of benzene is treated with 295 mg. of lithium acetylide-ethylenediamine complex. The mixture is warmed at 50° for twenty hours under nitrogen with stirring, and then 5 ml. of water is added and the mixture refluxed for one hour. The organic layer is separated, the aqueous phase diluted with more water and extracted with chloroform. The organic extracts are combined, washed with 8% salt solution, dried and evaporated to give the product.

EXAMPLE 21

N-acetyl 2,5-seco-3,4-bisnor-5-aza-17$\alpha$-vinyl-17$\beta$-hydroxy-B-homoandrostane 2-oic acid A mixture of 300 mg. of N-acetyl 2,5-seco-3,4-bisnor-5-aza-17$\alpha$-ethynyl-17$\beta$-hydroxy-B-homoandrostane 2-oic acid and 50 mg. of 5% palladium on carbon catalyst in 15 ml. of dioxane is hydrogenated until one mole equivalent of hydrogen is taken up. The catalyst is removed by filtration and the filtrate evaporated to give the product.

EXAMPLE 22

N-acetyl 2,5-seco-3,4-bisnor-5-aza-17$\alpha$-ethyl-17$\beta$-hydroxy-B-homoandrostane 2-oic acid A mixture of 300 mg. of N-acetyl 2,5-seco-3,4-bisnor-5-aza-17$\alpha$-ethynyl-17$\beta$-hydroxy-B-homoandrostane 2-oic acid and 50 mg. of 5% palladium on carbon catalyst in 15 ml. of dioxane is hydrogenated until two mole equivalents of hydrogen are taken up. The catalyst is removed by filtration and the filtrate evaporated.

EXAMPLE 23

2-carboxy-2,5-seco-3,4-bisnor-5-aza-17$\alpha$-vinyl-17$\beta$-hydroxy-B-homoandrostane Following the procedure in Example 13, but substituting N-acetyl 2,5-seco-3,4-bisnor-5-aza-17$\alpha$-vinyl-17$\beta$-hydroxy-B-homoandrostane 2-oic acid for N-acetyl 2,5-seco-3,4-bisnor-5-aza-B-homoandrostane - 17 - one 2-oic acid, there is obtained the title compound.

EXAMPLE 24

2-carboxy-2,4-seco-3,4-bisnor-5-aza-17α-ethyl-17β-hydroxy-B-homoandrostane

Following the procedure in Example 13, but substituting N-acetyl 2,5-seco-3,4-bisnor-5-aza-17α-ethyl-17β-hydroxy-B-homoandrostane 2-oic acid for N-acetyl 2,5-seco-3,4-bisnor-5-aza-B-homoandrostane-17-one-2-oic acid, there is obtained the title compound.

EXAMPLE 25

3,4-bisnor-5-aza-17α-vinyl-17β-hydroxy-B-homoandrostane 2-one

Following the procedure in Example 18, but substituting 2-carboxy-2,5-seco-3,4-bisnor-5-aza-17α-vinyl-17β-hydroxy-B-homoandrostane for 2-carboxy-2,5-seco-3,4-bisnor-5-aza-17β-hydroxy-B-homoandrostane, there is obtained the title compound.

EXAMPLE 26

3,4-bisnor-5-aza-17α-ethyl-17β-hydroxy-B-homoandrostane 2-one

Following the procedure in Example 18, but substituting 2-carboxy-2,5-seco - 3,4 - bisnor-5-aza-17α-ethyl-17β-hydroxy-B-homoandrostane, there is obtained the title compound.

EXAMPLE 27

2-carboxy-2,5-seco-3,4-bisnor-5-aza-17α-ethynyl-17β-hydroxy-B-homoandrostane

Following the procedure in Example 13, but substituting N-acetyl 2,5-seco-3,4-bisnor - 5 - aza-17α-ethynyl-17β-hydroxy-B-homoandrostane-2-oic acid for N-acetyl-2,5-seco-3,4-bisnor-5-aza-B-homoandrostane - 17 - one-2-oic acid, there is obtained the title compound.

EXAMPLE 28

3,4-bisnor-5-aza-ethynyl-17β-hydroxy-B-homoandrostane-2-one

Following the procedure in Example 18, but substituting 2-carboxy-2,5-seco-3,4-bisnor-5-aza-17α-ethynyl-17β-hydroxy-B-homoandrostane for 2-carboxy - 2,5 - seco-3,4-bisnor-5-aza-17β-hydroxy-B-homoandrostane, there is obtained the title compound.

EXAMPLE 29

3-oxa-17β-acetoxy-A-nor-B-norandrostane-5β-ol-2-one

Following the procedure in Example 1, but substituting an equivalent amount of 3-oxa-A-nor-B-norandrostane-5β,17β-diol-2-one for 3-oxa-A-norandrostane-5β,17β-diol-2-one, there is obtained the title compound.

EXAMPLE 30

Methyl 17β-acetoxy-2,5-seco-3,4-bisnor-B-norandrostane-5-one 2-oic acid

Following the procedure in Example 2, but substituting an equivalent amount of 3-oxa-17β-acetoxy-A-nor-B-norandrostane-5β-ol-2-one for 3-oxa-17β-acetoxy-A-nor-B-norandrostane-5β-ol-2-one, there is obtained the title compound.

EXAMPLE 31

Methyl 17β-hydroxy-2,5-seco-3,4-bisnor-B-norandrostane-5-one 2-oic acid

Following the procedure in Example 3, but substituting an equivalent amount of 3-oxa-17β-hydroxy-A-nor-B-norandrostane-5β-ol-2-one for 3-oxa - 17β - hydroxy-A-norandrostane-5β-ol-2-one, there is obtained the title compound.

EXAMPLE 32

Methyl 5-oximino-17β-acetoxy-2,5-seco-3,4-bisnor-β-norandrostane-2-oic acid

Following the procedure in Example 4, but substituting an equivalent amount of methyl-17β-acetoxy-2,5-seco-3,4-bisnor-B-norandrostane-5-one 2-oic acid for methyl-17β-acetoxy-2,5-seco-3,4-bisnorandrostane-5-one 2-oic acid, there is obtained the title compound.

EXAMPLE 33

17β-hydroxy-2,5-seco-3,4-bisnor-5-aza-androstane-6-one-2-oic acid

Following the procedure in Example 5, but substituting an equivalent amount of methyl 5-oximino-17β-acetoxy-2,5-seco-3,4-bisnor-B-norandrostane-2-oic acid for methyl 5 - oximino-17β-acetoxy-2,5-seco-3,4-bisnorandrostane-2-oic acid, there is obtained in the title compound.

EXAMPLE 34

Methyl 17β-hydroxy-2,5-seco-3,4-bisnor-5-aza-androstane-6-one 2-oic acid

Following the procedure in Example 6, but substituting an equivalent amount of 17β-hydroxy-2,5-seco-3,4-bisnor-5-aza-androstane-6-one 2-oic acid for 17β-hydroxy-2,5-seco-3,4-bisnor-5-aza-B-homoandrostane-6-one 2-oic acid, there is obtained the title compound.

EXAMPLE 35

2,17β-dihydroxy-2,5-seco-3,4-bisnor-5-aza-androstane

Following the procedure in Example 7, but substituting an equivalent amount of methyl 17β-hydroxy-2,5-seco-3,4-bisnor-5-aza-androstane-6-one 2-oic acid for methyl 17β-hydroxy-2,5-seco-3,4-bisnor-5-aza-androstane-6-one 2-oic acid for methyl 17β-hydroxy-2,5-seco-3,4-bisnor-5-aza-B-homoandrostane-6-one-2-oic acid, there if obtained the title compound.

EXAMPLE 36

N-acetyl 2,17β-diacetoxy-2,5-seco-3,4-bisnor-5-aza-androstane

Following the procedure in Example 8, but substituting an equivalent amount of 2,17β-dihydroxy-2,5-seco-3,4-bisnor-5-aza-androstane for 2,17β-dihydroxy-2,5-seco-3,4-bisnor-5-aza-B-homoandrostane, there is obtained the title compound.

EXAMPLE 37

N-acetyl 2,17β-dihydroxy-2,5-seco-3,4-bisnor-5-aza-androstane

Following the procedure in Example 9, but substituting an equivalent amount of N-acetyl 2,17β-diacetoxy-2,5-seco-3,4-bisnor-5-aza-androstane for N-acetyl 2,17β-diacetoxy - 2,5 - seco - 3,4-bisnor-5-aza-B-homoandrostane, there is obtained the title compound.

EXAMPLE 38

N-acetyl 2,5-seco-3,4-bisnor-5-aza-androstane-2-al-17-one

Following the procedure in Example 10, but substituting an equivalent amount of N-acetyl 2,17β-dihydroxy-2,5-seco-3,4-bisnor-5-aza-androstane for N-acetyl 2,17β-dihydroxy - 2,5-seco-3,4-bisnor-5-aza-B-homoandrostane, there is obtained the title compound.

EXAMPLE 39

N-acetyl 2,5-seco-3,4-bisnor-5-aza-androstane-17-one-2-oic acid

Following the procedure in Example 11, but substituting an equivalent amount of N-acetyl 2,5-seco-3,4-bisnor-5-aza-androstane-2-al-17-one for N-acetyl 2,5-seco-3,4-bisnor-5-aza-B-homoandrostane-2-al-17-one, there is obtained the title compound.

EXAMPLE 40

Methyl N-acetyl-2,5-seco-3,4-bisnor-5-aza-androstane-17-one-2-oic acid

Following the procedure in Example 12, but substituting an equivalent amount of N-acetyl 2,5-seco-3,4-bisnor-5-aza-androstane-17-one 2-oic acid for N-acetyl 2,5-seco-3,4-bisnor-5-aza-B-homoandrostane-17-one 2-oic acid, there is obtained the title compound.

EXAMPLE 41

2-carboxy-2,5-seco-3,4-bisnor-5-aza-androstane-17-one

Following the procedure in Example 13, but substituting an equivalent amount of N-acetyl 2,5-seco-3,4-bisnor-5-aza-androstane-17-one-2-oic acid for N-acetyl 2,5-seco-3,4 - bisnor - 5 - aza-B-homoandrostane-17-one-2-oic acid, there is obtained the title compound.

EXAMPLE 42

3,4-bisnor-5-aza-androstane-2,17-dione

Following the procedure in Example 14, but substituting an equivalent amount of 2-carboxy-2,5-seco-3,4-bisnor-5-aza-androstane-17-one for 2-carboxy-2,5-seco-3,4-bisnor-5-aza-B-homoandrostane-17-one, there is obtained the title compound.

EXAMPLE 43

N-acetyl-2,5-seco-3,4-bisnor-5-aza-17β-hydroxy-androstane 2-oic acid

Following the procedure in Example 15, but substituting an equivalent amount of N-acetyl 2,5-seco-3,4-bisnor-5-aza-androstane-17-one-2-oic acid for N-acetyl 2,5-seco-3,4 - bisnor - 5-aza-B-homoandrostane-17-one-2-oic acid, there is obtained the title compound.

EXAMPLE 44

N-acetyl-2,5-seco-3,4-bisnor-5-aza-17β-acetoxy-androstane 2-oic aicd

Following the procedure of Example 16, but substituting an equivalent amount of N-acetyl-2,5-seco-3,4-bisnor-5-aza-17β-hydroxy-androstane 2-oic acid for N-acetyl-2,5-seco-3,4-bisnor-5-aza-17β-hydroxy-B-homoandrostane 2-oic acid, there is obtained the title compound.

EXAMPLE 45

2-carboxy-2,5-seco-3,4-bisnor-5-aza-17β-hydroxy-androstane

Following the procedure of Example 17, but substituting an equivalent amount of N-acetyl-2,5-seco-3,4-bisnor-5-aza-17β-hydroxy (or 17β-acetoxy)-androstane 2-oic acid for N-acetyl-2,5-seco-3,4-bisnor-5-aza-B-homoandrostane-17-one 2-oic acid, there is obtained the title compound.

EXAMPLE 46

3,4-bisnor-5-aza-17β-hydroxy-androstane-2-one

Following the procedure of Example 18, but substituting an equivalent amount of 2-carboxy-2,5-seco-3,4-bisnor-5-aza-17β-hydroxy-androstane for 2-carboxy-2,5-seco-3,4-bisnor-5-aza-17β-hydroxy-B-homoandrostane, there is obtained the title compound.

EXAMPLE 47

3,4-bisnor-5-aza-17β-acetoxy-androstane-2-one

Following the procedure of Example 19, but substituting an equivalent amount of 3,4-bisnor-5-aza-17β-hydroxy-androstane-2-one for 3-oxa-A-norandrostane-5β,17β-diol 2-one, there is obtained the title compound.

EXAMPLE 48

N-acetyl 2,5-seco-3,4-bisnor-5-aza-17α-ethynyl-17β-hydroxy-androstane 2-oic acid Following the procedure of Example 20, but substituting an equivalent amount of N-acetyl 2,5-seco-3,4-bisnor-5-aza-androstane-17-one-2-oic acid for N-acetyl 2,5-seco-3,4-bisnor-5-aza-B-homoandrostane-17-one 2-oic acid, there is obtained the title compound.

EXAMPLE 49

N-acetyl 2,5-seco-3,4-bisnor-5-aza-17α-vinyl-17β-hydroxy-androstane 2-oic acid

Following the procedure of Example 21, but substituting an equivalent amount of N-acetyl 2,5-seco-3,4-bisnor-5-aza-17α-ethynyl-17β-hydroxy-androstane 2-oic acid for N-acetyl 2,5-seco-3,4-bisnor 5-aza-17α-ethynyl - 17β - hydroxy-B-homoandrostane 2-oic acid, there is obtained the title compound.

EXAMPLE 50

N-acetyl 2,5-seco-3,4-bisnor-5-aza-17α-ethyl-17β-hydroxy-androstane 2-oic acid

Following hte procedure of Example 22, but substituting an equivalent amount of N-acetyl 2,5-seco-3,4-bisnor-5-aza-17α-ethynyl-17β-hydroxy-androstane 2-oic acid for N-acetyl 2,5-seco-3,4-bisnor-5-aza-17α-ethynyl-17β - hydroxy-B-homoandrostane 2-oic acid, there is obtained the title compound.

EXAMPLE 51

2-carboxy-2,5-seco-3,4-bisnor-5-aza-17α-vinyl-17β-hydroxy-androstane

Following the procedure of Example 23, but substituting an equivalent amount of N-acetyl 2,5-seco-3,4-bisnor-5-aza-17α-vinyl-17β-hydroxy-androstane 2-oic acid for N-acetyl 2,5-seco-3,4-bisnor-5-aza-B-homoandrostane - 17-one 2-oic acid, there is obtained the title compound.

EXAMPLE 52

2-carboxy-2,4-seco-3,4-bisnor-5-aza-17α-ethyl-17β-hydroxy-androstane

Following the procedure of Example 24, but substituting an equivalent amount of N-acetyl 2,5-seco-3,4-bisnor-5-aza-17α-ethyl-17β-hydroxy-androstane 2-oic acid for N-acetyl 2,5-seco-3,4-bisnor-5-aza-B - homoandrostane - 17-one 2-oic acid, there is obtained the title compound.

EXAMPLE 53

3,4-bisnor-5-aza-17α-vinyl-17β-hydroxy-androstane 2-one

Following the procedure of Example 25, but substituting an equivalent amount of 2-carboxy-2,5-seco-3,4-bisnor-5-aza-17α-vinyl-17β-hydroxy-androstane for 2-carboxy-2,5-seco-3,4-bisnor-5-aza-17β-hydroxy - B - homoandrostane, there is obtained the title compound.

EXAMPLE 54

3,4-bisnor-5-aza-17α-ethyl-17β-hydroxy-androstane 2-one

Following the procedure of Example 26, but substituting an equivalent amount of 2-carboxy-2,5-seco-3,4-bisnor-5-aza-17α-ethyl-17β-hydroxy - androstane for 2-carboxy-2,5-seco-3,4-bisnor-5-aza-17β-hydroxy - B - homoandrostane, there is obtained the title compound.

EXAMPLE 55

2-carboxy-2,5-seco-3,4-bisnor-5-aza-17α-ethynyl-17β-hydroxy-androstane

Following the procedure of Example 27, but substituting an equivalent amount of N-acetyl 2,5-seco-3,4-bisnor-5-aza-17α-ethynyl-17β-hydroxy-androstane 2-oic acid for N-acetyl 2,5-seco-3,4-bisnor-5-aza-B-homoandrostane - 17-one 2-oic acid, there is obtained the title compound.

EXAMPLE 56

3,4-bisnor-5-aza-17α-ethynyl-17β-hydroxy-androstane 2-oic

Following the procedure of Example 28, but substituting an equivalent amount of 2-carboxy 2,5-seco-3,4-bisnor-5-aza-17α-ethynyl-17β-hydroxy-androstane for 2-carboxy-2,5-seco-3,4-bisnor-5-aza-17β-hydroxy - B - homoandrostane, there is obtained the title compound.

The invention may be variously embodied within the scope of the appended claims.

What is claimed is:
1. A compound of the formula

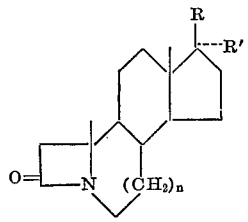

wherein R is selected from the group consisting of hydroxy and acyloxy wherein the acyl group is derived from lower alkanoic acids of less than twelve carbon atoms, R' is selected from the group consisting of hydrogen, ethyl, vinyl ethynyl, R and R' taken together represent oxo, and $n$ represents 1 or 2.

2. A compound in accordance with claim 1 having the name 3,4-bisnor-5-aza-B-homoandrostane-2,17-dione.

3. A compound in accordance with claim 1 having the name 3,4-bisnior-5-aza-B-homoandrostane-2,17-dione.

3. A compound in accordance with claim 1 having the name 3,4-bisnor-5-aza-17β-hydroxy-B-homoandrostane-2-one.

4. A compound in accordance with claim 1 having the name 3,4-bisnor-5-aza-17β-acetoxy-B-homoandrostane - 2-one.

5. A compound in accordance with claim 1 having the name 3,4-bisnor-5-aza-17α-vinyl-17β-hydroxy - B - homoandrostane 2-one.

6. A compound in accordance with claim 1 having the name 3,4-bisnor-5-aza-17α-ethyl-17β-hydroxy-B - homoandrostane 2-one.

7. A compound in accordance with claim 1 having the name 3,4-bisnor-5-aza-17-ethynyl-17β-hydroxy-B - homoandrostane-2-one.

References Cited
UNITED STATES PATENTS 3,507,873    4/1970    Clarkson _____ 260—289

ALEX MAZEL, Primary Examiner

R. V. RUSH, Assistant Examiner

U.S. Cl. X.R.

260—239BB, 239BF, 239.3T, 287R, 289R, 289QP, 468R, 514R; 424—244, 258

UNITED STATES PATENT OFFICE
CERTIFICATE OF CORRECTION

Patent No. 3,590,031            Dated June 29, 1971

Inventor(s) Seymour D. Levine

It is certified that error appears in the above-identified patent and that said Letters Patent are hereby corrected as shown below:

Column 3, line 3, "testisterone" should read --testosterone--.
Column 4, line 44, "(XXI) R=A" should read --(XXI) R=Ac--.
Column 5, formula (XXVIII) that portion reading

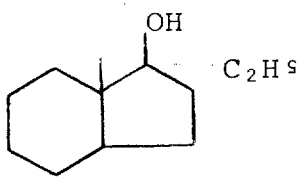   should read   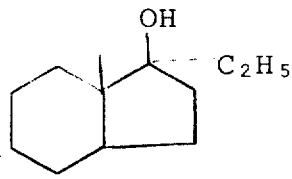

Column 6, line 31, "(XIV) should read --(XIX)--. Column 9, line 70, "of Example" should read --in Example--. Column 16, claim 7, line 16, "-17-" should read --17α- --.

Signed and sealed this 15th day of February 1972.

(SEAL)
Attest:

EDWARD M. FLETCHER, JR.          ROBERT GOTTSCHALK
Attesting Officer                 Commissioner of Patents